United States Patent
Lasser

(10) Patent No.: US 7,386,700 B2
(45) Date of Patent: Jun. 10, 2008

(54) VIRTUAL-TO-PHYSICAL ADDRESS TRANSLATION IN A FLASH FILE SYSTEM

(75) Inventor: Menahem Lasser, Kohav-Yair (IL)

(73) Assignee: Sandisk IL Ltd, Kfar Saba (IL)

( * ) Notice: Subject to any disclaimer, the term of this patent is extended or adjusted under 35 U.S.C. 154(b) by 55 days.

(21) Appl. No.: 11/025,982

(22) Filed: Jan. 3, 2005

(65) Prior Publication Data

US 2006/0026341 A1 Feb. 2, 2006

Related U.S. Application Data

(60) Provisional application No. 60/592,162, filed on Jul. 30, 2004.

(51) Int. Cl.
*G06F 12/00* (2006.01)
(52) U.S. Cl. .................. 711/202; 711/103; 711/206; 711/207; 711/212
(58) Field of Classification Search ............... None
See application file for complete search history.

(56) References Cited

U.S. PATENT DOCUMENTS

| | | | |
|---|---|---|---|
| 4,774,652 A * | 9/1988 | Dhuey et al. | 711/202 |
| 5,404,485 A | 4/1995 | Ban | |
| 5,937,425 A | 8/1999 | Ban | |
| 6,510,488 B2 * | 1/2003 | Lasser | 711/103 |
| 6,591,330 B2 | 7/2003 | Lasser | |
| 2004/0186946 A1* | 9/2004 | Lee | 711/103 |
| 2004/0225860 A1* | 11/2004 | Ahvenainen et al. | 711/212 |

* cited by examiner

*Primary Examiner*—Jasmine Song
(74) *Attorney, Agent, or Firm*—Mark M. Friedman

(57) ABSTRACT

A flash memory management system for a memory for accessing data from a host, the system including physical units and virtual units of the memory and a mapping mechanism of each virtual unit into one or more physical units, wherein the number of binary bits required for accessing each of the virtual units is less than the number of binary bits required for accessing each of the physical units.

28 Claims, 1 Drawing Sheet

VIRTUAL-TO-PHYSICAL ADDRESS TRANSLATION IN A FLASH FILE SYSTEM

CROSS REFERENCE TO RELATED APPLICATIONS

This application claims the benefit from U.S. provisional application 60/592,162 filed Jul. 30, 2004 by the present inventor.

FIELD AND BACKGROUND OF THE INVENTION

The present invention relates to an improved system for addressing flash memories and, more particularly, to an address translation in a flash file system that reduces the number of bits required for virtual addressing.

Flash devices include electrically erasable and programmable read-only memories (EEPROMs) made of flash-type, floating-gate transistors and are non-volatile memories similar in functionality and performance to EPROM memories, with an additional functionality that allows an in-circuit, programmable operation to erase portions of the memory. Flash devices have the advantage of being relatively inexpensive and requiring relatively little power as compared to traditional magnetic storage disks. However, flash devices have certain limitations that make using them at the physical address level a bit of a problem. In a flash device, it is not practical to rewrite a previously written area of the memory without a prior erase of the area, i.e. flash cells must be erased (e.g programmed to "one") before they can be programmed again. Erasing can only be done for relatively large groups of cells usually called "erase blocks" (typically of size 16 to 128 Kbytes in current commercial NAND devices, and of larger size in NOR devices). Therefore updating the contents of a single byte or even of a chunk of 1 kilobytes requires "housekeeping" operations—parts of the erase block that are not updated must first be moved elsewhere so they will be preserved during erasing, and then moved back into place.

Furthermore, some of the blocks of the device are "bad blocks", which are not reliable and their use should be avoided. Blocks are declared as "bad blocks" either by the manufacturer when initially testing the device, or by application software when detecting the failure of the blocks during use of the device in the field.

To overcome these limitations of the background art, a Flash File System (FFS) was disclosed in U.S. Pat. No. 5,404,485, which is assigned to the assignee of the present application and is hereby incorporated by reference as if fully set forth herein. FFS provides a system of data storage and manipulation on flash devices which allows these devices to emulate magnetic disks. In the existing art, applications or operating systems interact with the flash storage subsystem not using physical addresses but rather virtual addresses. There is an intermediary layer between the software application and the physical device that provides a mapping from the virtual addresses into the physical addresses. While the software may view the storage system as having a contiguous defect-free medium that can be read or written randomly with no limitations, the physical addressing scheme has "holes" in its address range (due to bad blocks, for example), and pieces of data that are adjacent to each other in the virtual address range might be greatly separated in the physical address range. The intermediary layer that does the mapping described above may be a software driver running on the same CPU on which the applications run. Alternatively, the intermediary layer may be embedded within a controller that controls the flash device and serves as the interface point for the main CPU of the host computer when the host computer accesses the storage. This is for example the situation in removable memory cards such as secure digital (SD) cards or multimedia cards (MMC), where the card has an on-board controller running a firmware program that among other functions, implements the type of mapping described above.

Software or firmware implementations doing such address mappings are typically called "flash management systems" or "flash file systems". The latter term is a misnomer, as the implementations do not necessarily support "files", in the sense that files are used in operating systems or personal computers, but rather support block device interfaces similar to those exported by hard disk software drivers. Still, the term is commonly used, and "flash file system" and "flash management system" are used herein interchangeably.

Other prior art systems that implement virtual-to-physical address mapping can be found in U.S. Pat. No. 5,937,425 disclosed by Ban and U.S. Pat. No. 6,591,330 disclosed by Lasser, both of which are incorporated by reference for all purposes as if fully set forth herein.

In U.S. Pat. No. 5,937,425, which is particularly suitable for NAND-type flash devices, the mapping is done as follows referring to FIG. 1 (prior art). Physical address space 13 is composed of units 111 that are actually the erase blocks i.e. the smallest chunks that can be erased. Each physical unit 111 contains one or more physical pages 113, where a page is the smallest chunk that can be written. A virtual address space 11 is composed of virtual units 121 that have the same size as the physical units. Each virtual unit contains one or more virtual pages 123, having the same size as physical pages 113. When a virtual address is provided by an application, for reading or writing, the virtual unit number to which that address belongs is extracted from the virtual address. There is a mapping that assigns to each virtual unit 121 either one physical unit 111 or a chain of more than one physical unit 111. Then physical page 113 corresponding to requested virtual page 123 within virtual unit 121 is located within the corresponding physical unit(s) 111, using a "local" mapping rule that relates virtual pages 123 to physical pages 113, or using control information stored with physical pages 113.

One of the advantages of the methods disclosed in U.S. Pat. No. 5,937,425 is that as the main mapping is done over units rather than pages, the translation tables become much smaller, as there are much fewer units than pages. Another advantage is write performance improvement that results from being able to assign more than one physical unit 111 to one virtual unit 121.

For a few reasons, the typical size of the valid virtual address range is slightly smaller than the size of the mapped-to physical address range. The reasons include:

(1) Virtual space 11 cannot include bad blocks and therefore virtual space 11 is "squeezed" to exclude bad blocks from its address range, while bad blocks may exist in physical space 13.

(2) For a flash file system supporting a one-to-many mapping, as disclosed in U.S. Pat. No. 5,937,425, virtual space 11 must be smaller than physical space 13.

In prior art flash management systems the number of bits required for representing a virtual address is the same as the number of bits required for representing a physical address. For example suppose a NAND flash device is composed of 1,024 physical units 111 each containing 32 pages 113 of 512 bytes (ignoring "extra" bytes in NAND devices that typically do not store user data but system information such as error correction codes). On the physical level the bytes address range is from zero to 16 megabytes minus one, requiring 24 bits for full representation. Using the methods of U.S. 5,937,425 that directly map only the unit addresses, we have 1,024 physical units 111 and requiring 10 bits. Assuming the virtual space 11 is smaller by 24 units, we get 1,000 virtual units 121 each containing 32 pages 123 of 512 bytes each. The number of bits for representing the full byte address is again 24, and the number of bits required for representing the number of virtual units is still 10. It is sometimes very desirable to have the number of bits required for representing a virtual address to be as low as possible. Both flash file systems and software applications keep addresses in tables and in various data structures, and the more bits an address requires the more RAM memory is spent.

There is thus a need for, and it would be highly advantageous to have a method for virtual to physical address translation in a flash file system that reduces the number of bits required for virtual addressing.

SUMMARY OF THE INVENTION

According to the present invention there is provided a flash memory management method for a flash memory for accessing data from a host. The method includes providing a physical address space of the flash memory, the physical address space addressable with physical addresses; and providing a virtual address space of the flash memory, the virtual address space addressable with virtual addresses and mapping the virtual addresses into the physical addresses so that the number of binary bits required for accessing each of the virtual addresses is less than the number of binary bits required for accessing each of the physical addresses.

According to the present invention there is provided, a flash memory management method for a flash memory for accessing data from a host, the method provides physical units of the flash memory; virtual units of the flash memory; and maps each of the virtual units into one or more of the physical units, so that the number of binary bits required for addressing each of the virtual units is less than the number of binary bits required for addressing each of the physical units.

According to the present invention there is provided a flash memory management system for a flash memory for accessing data from a host, the system includes the flash memory addressable with physical addresses, virtual addresses; and a mapping mechanism of the virtual addresses into the physical addresses, wherein the number of binary bits required for accessing each of the virtual addresses is less than the number of binary bits required for accessing each of the physical addresses.

According to the present invention there is provide a flash memory management system for a flash memory for accessing data from a host, the system includes physical and virtual units of the flash memory; and a mapping mechanism of the virtual units into the physical units, wherein the number of binary bits required for addressing each of the virtual units is less than the number of binary bits required for addressing each of the physical units.

According to the present invention there is provided a method of managing a flash memory in accessing the flash memory from a host. The method includes addressing the flash memory via a physical address space; and accepting from the host only addresses from a virtual address space that is smaller than the physical address space, wherein addresses of the virtual address space have fewer bits than physical addresses of the physical address space.

According to the present invention there is provided a memory device including a flash memory; and a controller that, in accessing the flash memory, addresses the flash memory using a physical address space, and that accepts from a host that addresses the memory device only addresses from a virtual address space, wherein addresses of the virtual address space have fewer binary bits than addresses of the physical address space.

According to the present invention there is provided a flash memory device including a flash memory containing physical flash memory units; and a controller that in accessing the flash memory, addresses the flash memory using addresses from a physical address space that employs physical units, and that accepts from a host that addresses the memory device only addresses from a virtual address space that employs virtual units, wherein addressing the virtual memory units requires fewer binary bits than required for addressing the physical memory units.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
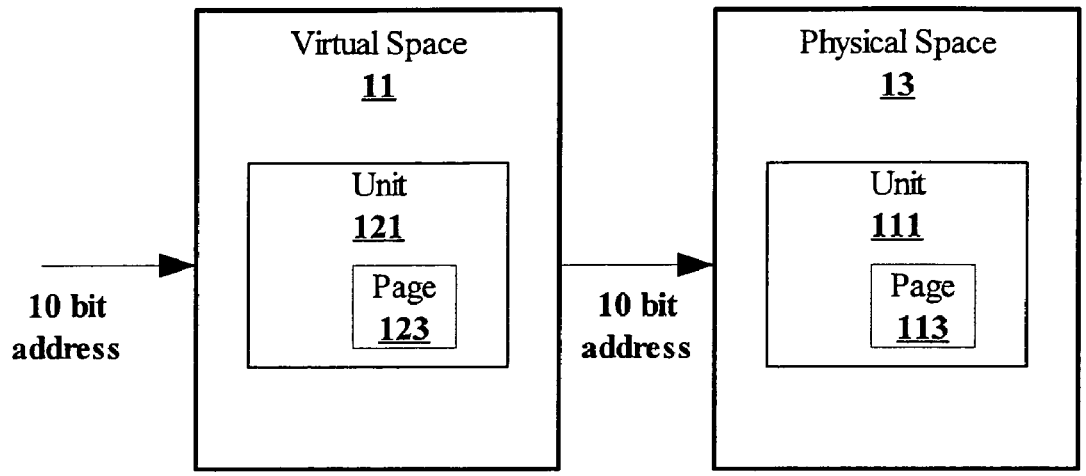
FIG. 1 (prior art) is a schematic representation of a conventional virtual to physical address translation in a flash file system.

The present invention is a virtual to physical address mapping in a flash file system that reduces the number of bits required for virtual addressing.

The principles and operation of the system and method, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The terminology as used herein of "units" and "pages" is not consistently used in the prior art. In U.S. Pat. No. 5,937,425 the term "block" is used instead of the term "page" as used herein. Other prior art systems use the term "sector" for "page" as used herein and other prior art systems use the term "block" for "unit" as used herein. The term "unit" is defined herein as the smallest chunk of memory that can be erased. The term "page" is defined herein as the smallest chunk of memory that can be written. The terms "bits" and "binary bits" are used herein interchangeably.

It should be noted that different prior art systems use different terms for "virtual" addressing—some use "virtual", some use "logical", others employ both terms in the same system, implementing a two-layer mapping between application-level addresses and device-level addresses, first mapping "virtual" to "logical" and then "logical" to "physical", or vice versa. All such mappings are within the applicable scope of the present invention. The mapping of the present invention requires only that the software using the device sees one address space, e.g. virtual, while the physical device employs a different address space, e.g. physical. The address spaces are defined herein to be "different" if a certain piece of data can have different addresses in the two address spaces. The terms "physical space" and "physical address space" are used herein interchangeably. The terms "virtual space" and "virtual address space" are used herein interchangeably. The term "accessing" memory is defined herein to refer to "reading or writing" to memory. The "number of bits" required to address a memory is defined to include leading bits, e.g. 00000001, requires eight bits for addressing.

It should be noted we are not referring here to the case where not all of the physical flash device takes part in the mapping. It is known in the art that some portion of the physical device is sometimes set aside for some special purpose (such as booting or operating system code image) that is accessed directly by physical addresses. Only the remaining portions of the device take part in the mapping and the corresponding virtual space is obviously also reduced. In such cases our discussion herein refers only to the mapped-to physical portion, as if this is the only portion existing in the device.

The present invention is an address mapping that reduces the number of bits in virtual addresses compared to the number of bits in physical addresses. Consider for example a low-cost flash controller implementing a flash file system in firmware and using the methods of U.S. Pat. No. 5,937,425. The mapping may be implemented using a conversion table indexed by physical unit number and storing virtual unit numbers. For the example, in the device discussed above, the table will consume 1,024×10=10,240 bits. If the virtual address could be guaranteed to never require more than 9 bits, then the consumed memory will be only 1,024× 9=9,216 bits. Moreover, if the controller's firmware cannot allocate single bits but only full bytes, then going down from 9 bits to 8 bits of address will result in much more significant memory saving, as each table entry will go down from two bytes to one byte. There is thus a great benefit to use flash file systems that, as part of the mapping from virtual to physical addresses, reduce the number of bits required to represent a virtual address.

In all embodiments of the present invention, a flash file system that reduces the bit count of the virtual address reduces the usable storage capacity, but in many cases there is no need for a higher capacity and a larger device is used only because of unavailability of a smaller one. Also, it is known that flash file systems of the type of U.S. Pat. No. 5,937,425 perform better as the number of virtual units 121 is made smaller compared to the number of physical units 111 because more one-to-many virtual-to-physical unit assignments exist in the mapping at the same time, and therefore the average write performance is improved due to more efficient erasing. So there are considerations that justify the loss of virtual storage capacity, and therefore the present invention of reducing virtual address bit count in the mapping is advantageous.

Current flash file systems do not reduce the number of address bits while mapping addresses. The reason for this is closely related to the fact that the flash devices in common use typically contain a number of physical units that is an exact power of two. For example, the above device of 1,024 units has the number of units as two to the power of ten ($2^{10}$). As a result, reducing the virtual address range by a few percent, which is the typical difference between virtual and physical ranges, is not enough to "cross the boundary" into a lower-bit-count address range.

However, having the size of flash devices an exact power of two is not mandatory. There is no physical obstacle to building a flash device with a number of physical units 111 other than a power of two, such as 600 or 700. An advantage of having the number of physical units 111 slightly greater than a power of two is related to bad blocks. Flash manufacturers typically include some spare blocks in the flash silicon die, anticipating the detection of bad blocks during device testing. Following testing, there is a replacement stage during which the detected bad blocks are replaced by good spare blocks, so that the device can be shipped with a fewer number and preferably zero bad blocks. A drawback of this method is that any good spare blocks that are not needed for replacement are lost to the user.

Figure 2:
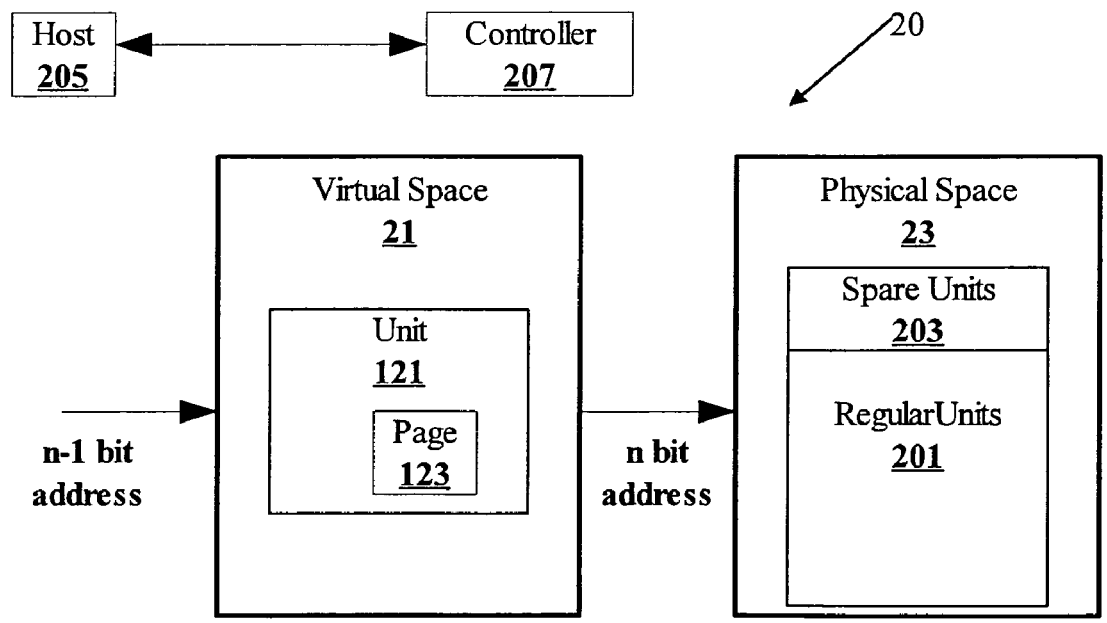
FIG. 2 is a schematic representation of a virtual to physical address translation in a flash file system, according to an embodiment of the present invention.

Reference is now made to FIG. 2, a schematic representation of a virtual-to-physical memory mapping 20, according to an embodiment of the present invention. FIG. 2 shows memory mapping 20 of virtual space 21 to physical space 23.

Memory mapping 20 is achieved during memory management according to the present invention by host 205 with flash memory controller 207.

Physical space 23 provides a number of "regular" units 201 that is a power of two, and also provides spare units 203 as additional units with addresses immediately following the "regular" units. The flash device then has a total number of units, regular units 201 plus spare units 203 that is slightly higher than an exact power of two, e.g by 0.5%. The flash file system reduces the number of address bits in virtual space 21, according to the present invention, without sacrificing many units 121 in virtual space 21. For example, if the flash device provides extra 10 spare units 203, then physical space 23 includes units, regular units 201 plus spare units 203, numbered from zero to 1,024+10−1=1,033, requiring 11 address bits. The improved flash file system, according to the present invention, reduces virtual space 21 to virtual units 121 numbered from zero to 1,009, requiring only 10 address bits, while keeping the difference in size between physical and virtual address ranges relatively small.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. A flash memory management method comprising the steps of:
    (a) providing a physical address space of the flash memory, said physical address space being set for a number of physical units and being addressable with a plurality of physical addresses, said number of physical units being greater than $2^n$ and less than $2^{n+1}$, where n is an integer;
    (b) providing a virtual address space of the flash memory, said virtual address space being set for a smaller number of virtual units than said number of physical units in said physical address space and being addressable with a plurality of virtual addresses; and
    (c) mapping said virtual addresses into said physical addresses, wherein the number of binary bits required for accessing each of said virtual addresses is smaller than the number of binary bits required for accessing each of said physical addresses.

2. The flash memory management method, according to claim 1, wherein the number of binary bits required for accessing each of said virtual addresses is one less than the number of binary bits required for accessing each of said physical addresses.

3. The method of claim 1, wherein said mapping is performed in software managing the flash memory.

4. The method of claim 1, wherein said number of virtual units is at most $2^n$.

5. A flash memory management method comprising the steps of:
   (a) providing a plurality of physical units of the flash memory, a number of said physical units being greater than $2^n$ and less than $2^{n+1}$, where n is an integer;
   (b) providing a plurality of virtual units of the flash memory, a number of said virtual units being less than said number of physical units; and
   (c) mapping each of said virtual units into at least one of said physical units, wherein the number of binary bits required for addressing each of said virtual units is smaller than the number of binary bits required for addressing each of said physical units.

6. The flash memory management method, according to claim 5, wherein the number of binary bits required for accessing each of said virtual units is one less than the number of binary bits required for accessing each of said physical units.

7. The method of claim 5, wherein said mapping is performed in software managing the flash memory.

8. The method of claim 5, wherein said number of virtual units is at most $2^n$.

9. A flash memory management system comprising:
   (a) the flash memory including a plurality of physical units that are addressable with a plurality of physical addresses, a number of said physical units being greater than $2^n$ and less than $2^{n+1}$, where n is an integer;
   (b) a plurality of virtual addresses of a smaller number of virtual units than said number of physical units; and
   (c) a mapping mechanism of said virtual addresses into said physical addresses, wherein the number of binary bits required for accessing each of said virtual addresses is smaller than the number of binary bits required for accessing each of said physical addresses.

10. The flash memory management system, according to claim 9, wherein the number of binary bits required for accessing each of said virtual addresses is one less than the number of binary bits required for accessing each of said physical addresses.

11. The system of claim 9, wherein said mapping is performed in software managing the flash memory.

12. The system of claim 9, wherein said number of virtual units is at most $2^n$.

13. A flash memory management system comprising:
   (a) a plurality of physical units of the flash memory, a number of said physical units being greater than $2^n$ and less than $2^{n+1}$, where n is an integer;
   (b) a plurality of virtual units, a number of said virtual units being less than said number of physical units;
   (c) a mapping mechanism of said virtual units into said physical units, wherein the number of binary bits required for addressing each of said virtual units is smaller than the number of binary bits required for addressing each of said physical units.

14. The flash memory management system, according to claim 13, wherein the number of binary bits required for accessing each of said virtual units is one less than the number of binary bits required for accessing each of said physical units.

15. The system of claim 13, wherein said mapping is performed in software managing the flash memory.

16. The system of claim 13, wherein said number of virtual units is at most $2^n$.

17. A method of managing a flash memory comprising:
   (a) addressing the flash memory via a physical address space being set for a number of physical units, said number of physical units being greater than $2^n$ and less than $2^{n+1}$, where n is an integer; and
   (b) accepting from a host of the flash memory only addresses from a virtual address space that is set for a smaller number of virtual units than said number of physical units in said physical address space and so is smaller than said physical address space, addresses of said virtual address space having fewer bits than physical addresses of said physical address space.

18. The method of managing a flash memory, according to claim 17, wherein said address of said virtual address space have one fewer bit than said physical addresses of said physical address space.

19. The method of claim 17, wherein a mapping of said virtual addresses into said physical addresses is performed in software managing the flash memory.

20. The method of claim 17, wherein said number of virtual units is at most $2^n$.

21. A memory device comprising:
   (a) a flash memory including a plurality of physical units, a number of said physical units being greater than $2^n$ and less than $2^{n+1}$, where n is an integer; and
   (b) a controller that, in accessing said flash memory, addresses said flash memory using a physical address space, and that accepts from a host that addresses the memory device only addresses from a virtual address space that is set for a smaller number of virtual units than said number of physical units in said physical address space, so that addresses of said virtual address space.

22. The memory device, according to claim 21, wherein said addresses of said virtual address space have one fewer binary bit than said addresses of said physical address space.

23. The device of claim 21, wherein a mapping of said virtual addresses into said physical addresses is performed in software managing the flash memory.

24. The device of claim 21, wherein said number of virtual units is at most $2^n$.

25. A flash memory device comprising:
   (a) a flash memory containing a plurality of physical flash memory units, a number of said physical flash memo units being greater than $2^n$ and less than $2^{n+1}$, where n is an integer; and
   (b) a controller that, in accessing said flash memory, addresses said flash memory using addresses from a physical address space that employs physical units equal in number to said physical flash memory units, and that accepts from a host that addresses the memory device only addresses from a virtual address space that employs virtual units that are fewer in number than said physical units, wherein addressing said virtual memory units requires fewer binary bits than required for addressing said physical memory units.

26. The flash memory device, according to claim 25, wherein said addressing said virtual memory units requires one fewer bit than required for addressing said physical memory units.

27. The device of claim 25, wherein a mapping of said virtual units into said physical units is performed in software managing the flash memory.

28. The device of claim 25, wherein said number of virtual units is at most $2^n$.

* * * * *

UNITED STATES PATENT AND TRADEMARK OFFICE
CERTIFICATE OF CORRECTION

PATENT NO. : 7,386,700 B2  Page 1 of 1
APPLICATION NO. : 11/025982
DATED : June 10, 2008
INVENTOR(S) : Menahem Lasser It is certified that error appears in the above-identified patent and that said Letters Patent is hereby corrected as shown below:

Claim 21, column 8 — the end of the sentence is missing:

Line 34: add at end of line after "space" but before "."
    --have fewer binary bits than addresses of said physical address space--

Claim 25, column 8

Line 44: at the end of the line, correct "memo" to read --memory--

Signed and Sealed this

Second Day of September, 2008

JON W. DUDAS
*Director of the United States Patent and Trademark Office*